July 28, 1964 J. T. MILLS ET AL 3,142,604
APPARATUS FOR MAKING NON-WOVEN PILE FABRICS
Filed March 6, 1961 8 Sheets-Sheet 1

July 28, 1964 J. T. MILLS ET AL 3,142,604
APPARATUS FOR MAKING NON-WOVEN PILE FABRICS
Filed March 6, 1961 8 Sheets-Sheet 4

Fig. 4

July 28, 1964 J. T. MILLS ET AL 3,142,604
APPARATUS FOR MAKING NON-WOVEN PILE FABRICS
Filed March 6, 1961 8 Sheets-Sheet 5

July 28, 1964     J. T. MILLS ET AL     3,142,604
APPARATUS FOR MAKING NON-WOVEN PILE FABRICS
Filed March 6, 1961     8 Sheets-Sheet 6

United States Patent Office 3,142,604
Patented July 28, 1964

3,142,604
APPARATUS FOR MAKING NON-WOVEN
PILE FABRICS
John Thompson Mills, Elkins Park, and Raymond E. Fleming, Philadelphia, Pa., assignors to Jennings Engineering Company, Philadelphia, Pa.
Filed Mar. 6, 1961, Ser. No. 93,611
1 Claim. (Cl. 156—435)

This invention relates to systems and apparatus for making non-woven fabrics from a web or sheet of thermoplastic material and a warp of suitable textile material.

In accordance with the present invention, the apparatus as used for making non-woven pile fabric comprises an extruder for discharging a web of hot plastic, a transversely slotted conveyor for transporting pile warp into engagement and joinder with the hot plastic web, a loop-forming mechanism in advance of the extruder and cooperating with the slotted conveyor to form pile loops whose root portions provide a surface engaged by the hot plastic web, and means adjacent the conveyor path beyond the extruder for pressing and cooling the hot plastic web applied to the looped pile warp. Preferably, the warp is a thermoplastic yarn and the root portions of the pile loops melt upon contact with the hot extruded web to effect fusion bonding between the pile facing and the thermoplastic backing web. The resulting non-woven fabrics are among those described and claimed in copending application Serial No. 75,281. By disabling or omitting the aforesaid loop-forming mechanism and supplying fewer spaced warp strands per unit width, the apparatus makes a strong non-woven fabric strip suited for bath mats, car mats and the like.

Also in accordance with the present invention, the apparatus includes means for preheating the warp strands when of nylon or similar thermoplastic yarn to facilitate formation of the fusion bond with the hot plastic web, particularly when the web is of reduced thickness for uses requiring great flexibility of the fabric.

Further in accordance with the invention, the loop-forming mechanism comprises a pair of blades which are reciprocated in synchronism with the conveyor by operating mechanisms which provide such different laws of blade motion that the configuration of a formed pile loop is not affected by the operations incident to formation of the next loop.

The invention further resides in systems and apparatus having features of construction, combination and arrangement hereinafter described and claimed.

For a more detailed understanding of the invention, reference is made, in the following description of a preferred form thereof, to the attached drawings in which:

FIG. 8 is a fragmentary view of parts shown in preceding figures and is referred to in discussion of the formation of fusion bonds and mechanical bonds in a non-woven pile fabric suited for carpets, rugs and the like;

Figure 1:
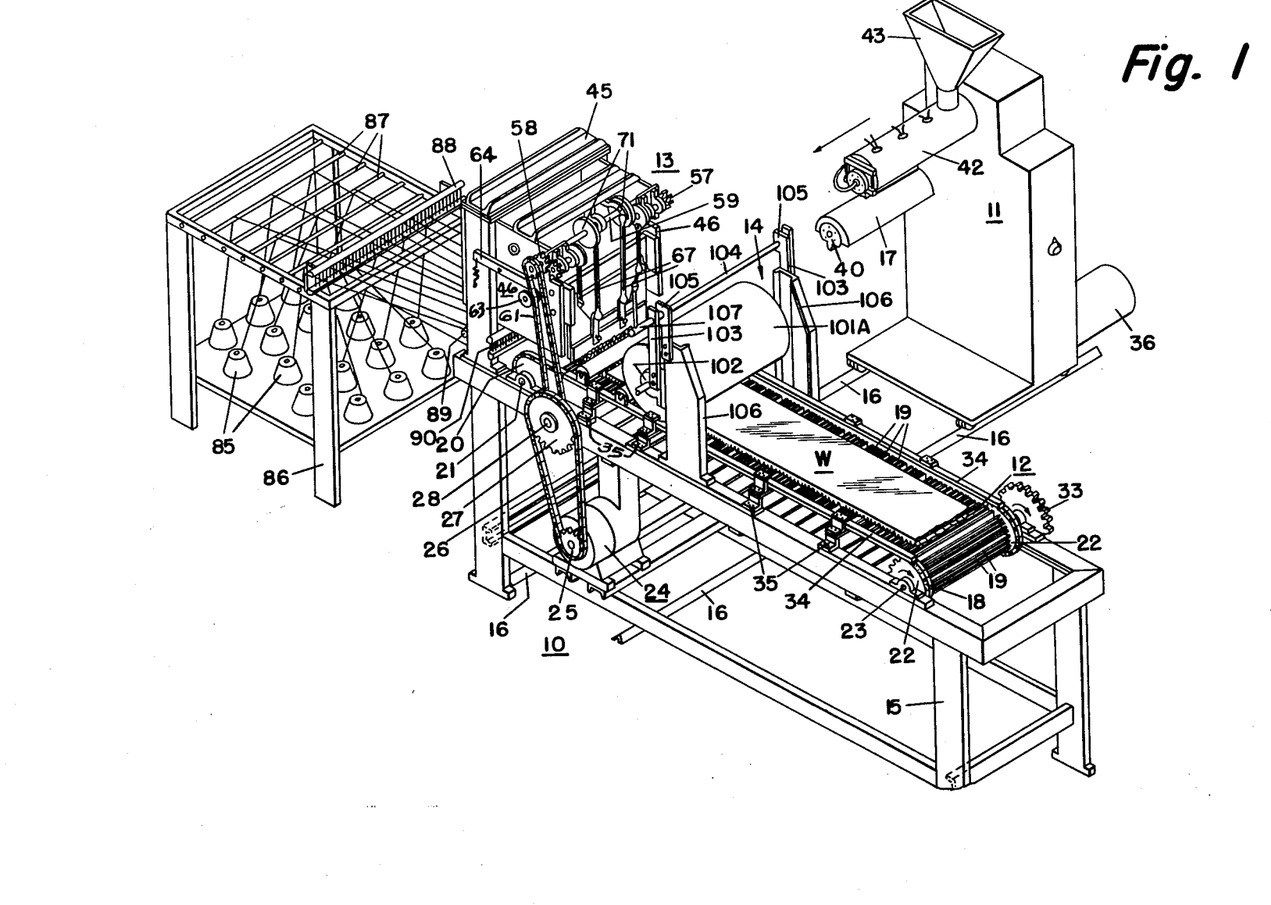
FIG. 1 is a perspective view showing various main components of the system with the extruder in retracted position.
Figure 2:
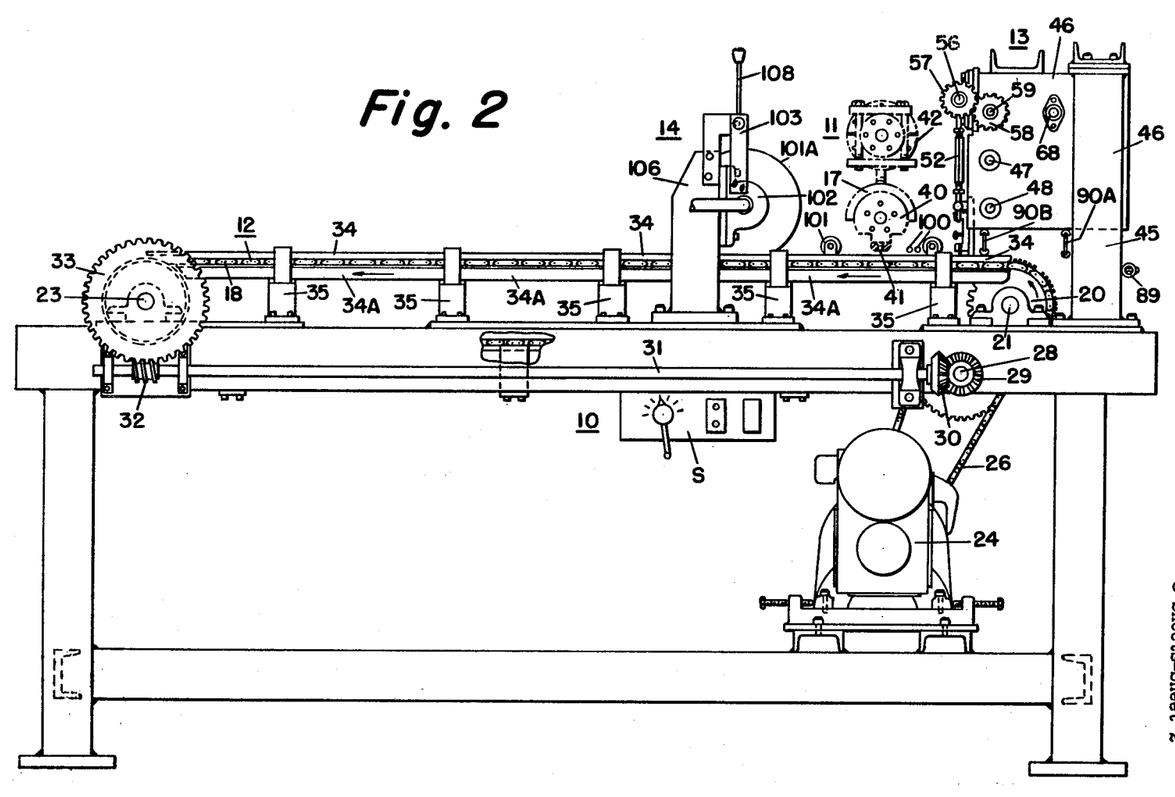
FIG. 2 is a rear elevational view of the apparatus of FIG. 1 with addition of components not shown therein.
Figure 3:
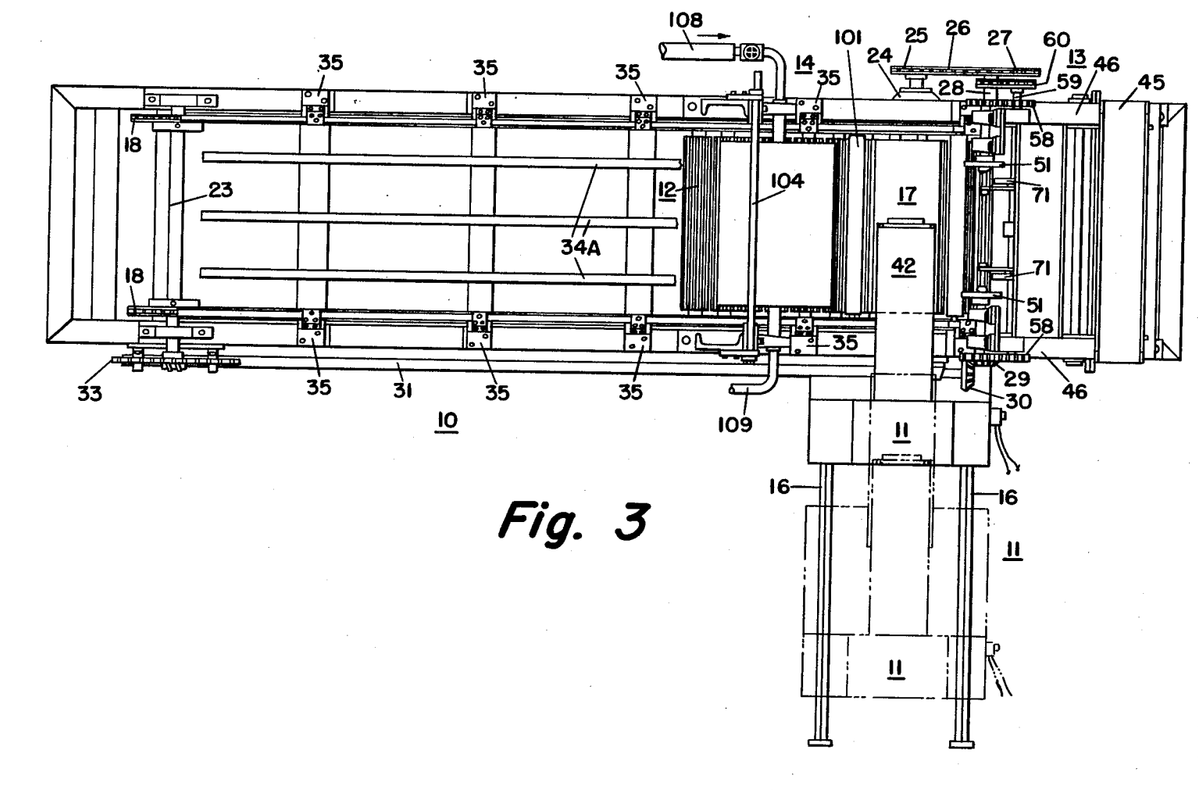
FIG. 3 is a top plan view of apparatus shown in FIG. 1: the extruder being shown by full lines in its operating position and in dotted outline for its retracted position of FIG. 1.

Referring particularly to FIGS. 1 to 3, the main components of the machine 10 are an extrusion unit 11, an endless conveyor 12, a loop-forming mechanism 13 and pressure-applying and chilling means 14. The conveyor, the loop-forming mechanism and the pressing and chilling mechanisms are mounted on a supporting framework 15. During the warm-up period preliminary to a run, the extruder unit (as shown in FIG. 1 and in dotted-line in FIG. 3) is in retracted position on its guide rails 16 with its extrusion head 17 away from its normal position (shown in full-line in FIG. 3) directly above conveyor 12 between the loop-forming mechanism 13 and the pressing and chilling mechanism 14.

The conveyor 12 which extends from a region in advance of the loop-forming mechanism to and beyond the pressing and chilling mechanism comprises a pair of spaced endless chains 18, 18 bridged by a multiplicity of thin long bars 19 spaced parallel to each other uniformly throughout the length of the conveyor to form a slotted surface. For dense carpets or rug fabrics, the center-to-center spacing of bars 19 is usually in the range of from about 0.075" to 0.5" depending upon the fabric to be made. At the receiving end of the conveyor, its chains 18 pass over a pair of sprockets 20, 20 on shaft 21. At the discharge end of the conveyor, these chains pass over a pair of sprockets 22, 22 on shaft 23. To aid in maintaining the upper edges of the bars 19 of the upper flight of the conveyor in a common flat plane, the conveyor 12 is driven from its discharge end so to keep the upper flight under tension. More specifically, the sprockets 22 are driven from motor 24 by sprocket 25 on the motor shaft (FIG. 1), chain 26, sprocket 27 on shaft 28, bevel gear 29 on the opposite end of shaft 28 (FIG. 2), bevel gear 30 on shaft 31, worm 32 on the opposite end of shaft 31, and worm wheel 33 on sprocket shaft 23.

The speed of motor 24 is variable, as by controller S (FIG. 2), to match the speed of conveyor 12 to the rate at which the unit 11 extrudes a hot plastic sheet or web.

To preclude upward buckling of the upper flight of conveyor 12, the chains 18, 18 pass below and are engaged by the guides 34 supported by brackets 35 suitably spaced along and attached to the top member of framework 15. The spaced bars 34A, FIGS. 2 and 3, extending just below the top flight of the conveyor along the path of movement of the bars 19 also serve to maintain the top edges of the bars in a common flat plane. As will later appear, this insures that the pile loops will be of uniform depth and that the formed fabric will lie flat.

With the extrusion unit in its normal or operating position, the discharge orifice 41 (FIG. 2) of the web-extruding die 40 in the underface of head 17 is slightly above the slotted plane surface defined by the upper edges of bars 19 of the conveyor. The length of the discharge orifice 41 is somewhat less than the width of the conveyor and closely approximates the width of the fabric to be made. The opening of the die orifice is usually preselected in the range of 45 mils to 75 mils but may be of greater or lesser width for particular products: for example, for polyethylene (Alathon 14 or 14A), excellent flexible rug fabric is obtained with an orifice of 54 mils.

During a run, the die 40 is continuously supplied at high pressure with molten plastic from the feed cylinder 42 to discharge a continuous web or sheet of hot plastic toward the upper surface of conveyor 12. Before the beginning of a run, granular plastic fed from hopper 43 to cylinder 42 is heated, as by electric heating means, to a temperature suitably above the melting point of the plastic to be extruded. When that temperature has been attained, a feed worm (not shown) within the cylinder is driven from motor 36 (FIG. 1) to supply molten plastic to the extruder head. The speed of the feed worm and the temperature of the molten plastic are adjusted or set as hereinafter more fully discussed to obtain the desired flow characteristics and heat content of the discharged web. The extruder unit is then moved into operating position above conveyor 12 (full-line position, FIG. 3) to discharge the molten web onto the looped pile material which in the meantime has been formed on the conveyor 12 as later described. The temperature of the plastic is automatically controlled, as by thermostatic means, to maintain the discharged plastic at a preselected temperature. The preferred web material is polyethylene although nylon, Delrin, polypropylene or polyvinyl chloride or other suitable thermoplastic may be used.

Figure 4:
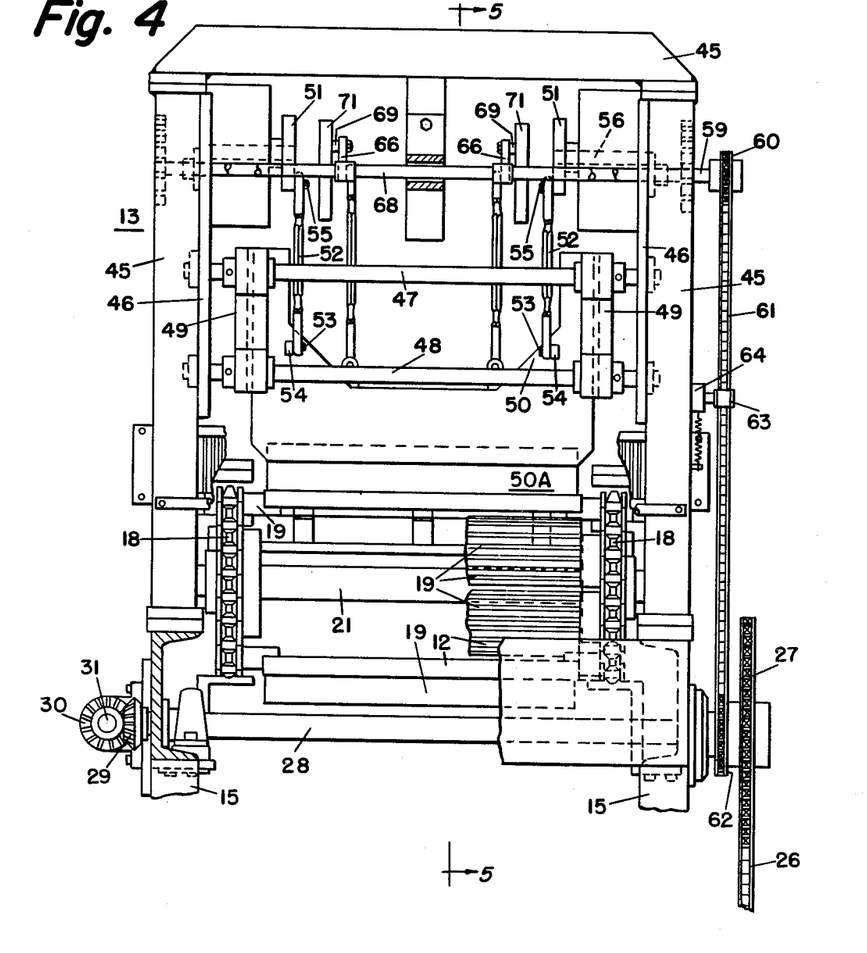
FIG. 4 is a fragmentary end elevational view, on enlarged scale, of loop-forming mechanism shown in the preceding figures.

In the preferred form shown in FIGS. 1 to 5, the loop-forming mechanism 13 comprises an inverted U-frame 45 attached to the main frame 15 and having side members 46 which extend above the receiving end of the conveyor 12. As best shown in FIG. 4, the bars 47, 48 extending between the side members 46 support a pair of slotted guides 49 for the opposite vertical edges of a slide member 50. To the lower edge of slide 50 is attached a thin loop-forming blade 50A (FIGS. 4, 5) of length approximating the width of the conveyor 12. This blade is suspended from and driven by a pair of crank discs 51, 51 through a pair of links 52, 52 respectively connected at their lower ends to bearing pins 53, 53 supported by posts 54, 54 extending outwardly from slide 50. At their upper ends, the links 52, 52 are received by bearing pins 55, 55 extending from the crank disc 51. These crank discs, or equivalent crank arms, are respectively attached to the inner ends of the short shafts 56, 56 extending through bearings in the corresponding side frame members 46, 46. The spur gears 57, 57 (FIG. 1) on the outer ends of the shafts 56, 56 mesh with gears 58, 58 on a shaft 59 which extends through bearings in both of the side frame members 46, 46.

As shown in FIGS. 1 and 4, shaft 59 is driven from the motor-driven shaft 28 by a chain 61 which passes over the sprockets 60 and 62 respectively attached to those shafts. The idler roll or sprocket 63 which engages chain 61 is carried by arm 64 which may be adjusted to minimize the slack in chain 61 and so maintain precise timing of the reciprocation of slide 50 with respect to motion of conveyor 12.

Figure 6:
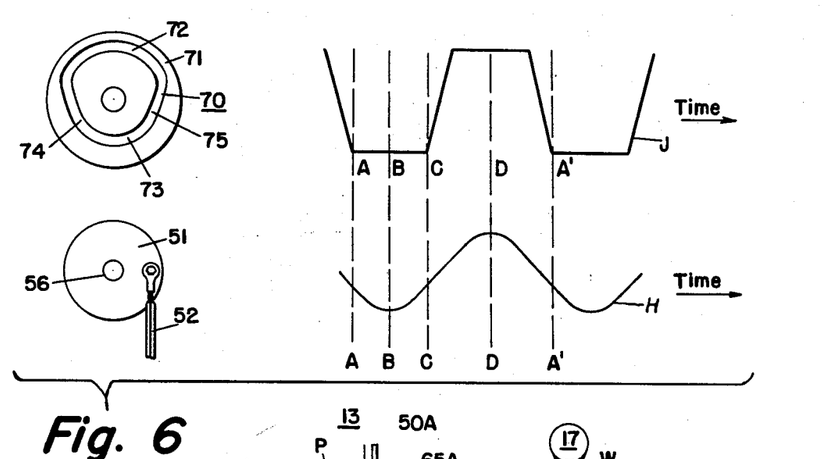
FIG. 6 is an explanatory view showing operating members for the loop-forming blades and resulting time/displacement curves of the blade motions.

By virtue of its crank arm drive, the slide 50 has a linear harmonic motion as exemplified by sine curve H of FIG. 6. The gear ratios of the drives for the conveyor 12 and slide 50 are so selected that the slide makes one cycle of reciprocation for an advance of the conveyor proportional to the center-to-center spacing of the conveyor bars: preferably and for dense fabric, the proportionality factor is unity. The phasing of the motion of the slide 50 is primarily determined by the angular setting of crank discs 51 on their shaft and is such that in each cycle of loop-forming mechanism 13 the blade 50A moves into and out of the gap between one pair of bars 19 of conveyor 12.

The depth of penetration of the blade 50A into the gaps between successive pairs of bars 19 can be varied by adjusting the length of links 52 which include a turnbuckle section for such purpose. Thus, the depth of the pile may be varied over a substantial range, up to one-half inch for example, for a fixed stroke of the blade slide 50. For an initial part of its down-stroke and for a like terminal part of its up-stroke, the blade 50A is above the plane defined by the upper edges of the conveyor bars 19.

Figure 5:
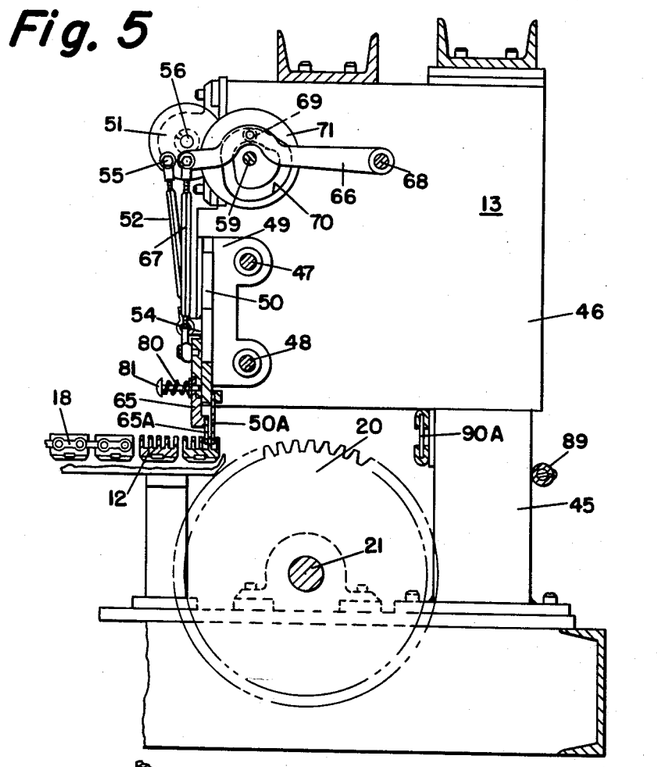
FIG. 5 is a sectional view taken on line 5—5 of FIG. 4.
Figure 5A:
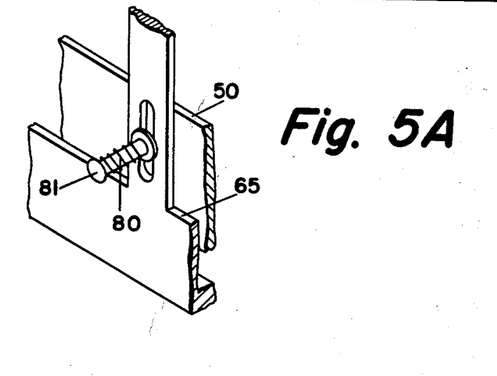
FIG. 5A is a fragmentary detailed view in perspective and on enlarged scale, of a yielding interconnection between loop-forming blades shown in FIG. 5.

Spaced behind blade 50A in the direction of conveyor travel and at distance approximately equal to the center-to-center spacing of the conveyor bars 19 is at least one loop-holding blade 65A which reciprocates at the same cyclic rate as blade 50A but which has a different law of motion as will be explained. The second blade 65A is of substantially the same length as blade 50A and is attached to the bottom of a second slide member 65. As shown in FIGS. 4 and 5, slide 65 is connected to a pair of cam-follower arms 66 by a pair of links 67, 67 each including a turn-buckle section for adjustment of the position of the slide at the ends of its stroke. The slide 65 is biased into engagement with slide 50 by expansion springs 80, 80 (FIG. 5A). Each of these springs encircles a stud 81 attached to slide 50 and extending through a vertical slot in an extension of slide 65. The spring pressure exerted against the heads of the studs and slide 65 normally holds the slide 65 against slide 50 but permits the slide 65 to yield in the direction of movement of conveyor 12.

The operating arms 66 for slide 65 are pivotally supported by shaft 68 (FIGS. 4 and 5) extending between the side frame members 46. The rollers 69 carried by arms 66 serve as cam-followers and are each received by the cam track groove 70 of the associated cam member 71. The two cams 71 are attached to shaft 59, driven as above described, so they are rotated the same number of revolutions per minute as the crank discs 51 which actuate the slide 50. As best shown in FIGS. 5 and 6, the cam groove 70 of each cam 71 has two dwell sections 72, 73 respectively corresponding with the top and bottom positions of blade 65A. These two dwell sections of the cam groove are connected by stroke sections 74, 75.

As appears from curve J of FIG. 6, the loop-holding blade 65A moves very rapidly to and from its end-stroke positions but remains at rest in its uppermost and lowermost positions for a substantial part of each cycle. Specifically, the dwell sections may each be about 135° in arcuate length and each of the stroke sections may be about 45° in arcuate length.

As evident from comparison of curves H and J, the loop-forming blade 50A and loop-holding blade 65A operate at the same frequency, but blade 65A completes its down-stroke well before blade 50A, which remains at the bottom of its stroke until after blade 50A has completed nearly half of its up-stroke and reaches the top of its up-stroke well before blade 65A. The significance of this will become more evident in the subsequent description of the loop-forming operation of the blades.

The pile material P supplied to the loop-forming mechanism 13 may be a mat of felted fibers corresponding in width to the fabric to be made, or, preferably as indicated in FIG. 1, it is a warp of yarn strands in number corresponding with the desired ends per inch times the width in inches of the fabric to be made. In the latter case, the pile material may be supplied from a plurality of spools or cones 85 suitably mounted on a rack or frame 86. In avoidance of tangling, the individual strands from the spools are divided into groups passing over the corresponding one of the rods 87 and thence individually through a corresponding one of the gaps between the teeth of reed or comb 88 mounted on the frame 86. From here, the strands converge toward the receiving end of conveyor 12 as they pass over bar 89 and through reed 90A and/or reed 90B (FIG. 2) of the loop-forming mechanism 13. The pile strands may all be of the same color or may be of different colors arranged in accordance with a desired pattern.

At the beginning of a run, the ends of the pile strands are pulled manually into position below and beyond the blades 50A, 65A, but thereafter in operation of the machine the conveyor 12 and the loop-forming mechanism 13 are jointly effective to pull the strands to and beyond such position. At time A (FIG. 6), in the cycle of operation of the loop-forming mechanism, the blade 65A is at the bottom of its stroke (step #1 of FIG. 7) and so holds the loop L of pile material formed by blade 50A in the preceding cycle. Thus, as blade 50A moves to its bottom position in the instant cycle (step #2 of FIG. 7) to form loop $L_1$, it is precluded from straightening out the previously formed loop L. Instead, the length of pile material required to form loop $L_1$ is pulled by the blade 50A during that portion of its stroke from A to B and by the forward motion of conveyor 12, from the spools or other source of pile material. In specific instances, it may be desirable to pre-feed the yarn into the machine.

In the time interval from B to C, the blade 50A rises from the bottom of the loop $L_1$ formed by it between the corresponding pair of conveyor bars, but the blade 65A remains at the bottom of its stroke in loop L so that the loop cannot be straightened out by the continuing forward motion of conveyor 12 which is effective to pull a corresponding further length of pile from the spools or other source. The yielding connection afforded by springs 80 permits the blade 65A to move forward with the conveyor.

Figure 7:
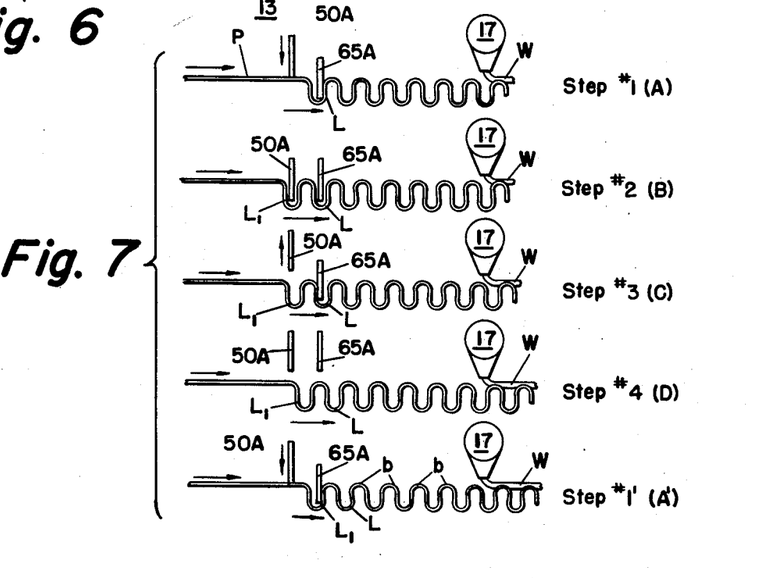
FIG. 7 is an explanatory figure referred to in discussion of FIG. 6.
Figure 8:
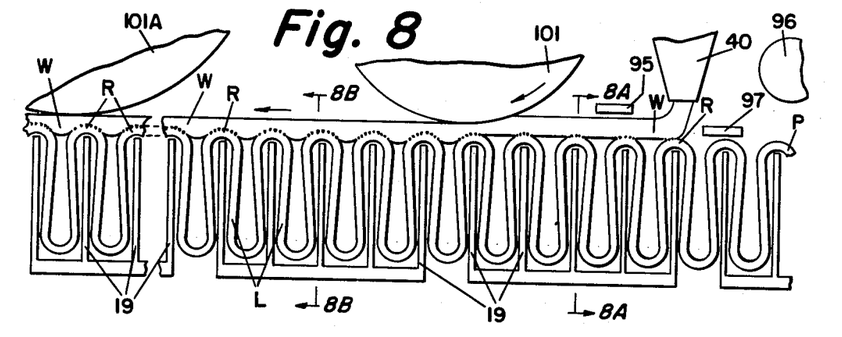

In the interval from C to D, the blade 65A rises out of loop $L_1$ (step #4 of FIG. 7) and the conveyor 12 by its continued forward movement pulls further pile material from the spools and advances the loop $L_1$ toward the position shown in step I′ of FIG. 7. Before the blade 50A initiates formation of the next loop, the blade 65A rapidly descends to hold the loop $L_1$ in place as shown. The foregoing steps are repeated in the successive cycles of the machine thus to form from each of the strands a series of pile loops along the conveyor. The corresponding loops of the different strands lie parallel to each other transversely of the conveyor. The base or root portions R of the pile loops L define a fabric surface on the upper edges of the conveyor blades which is moved by the conveyor towards intersection with the path of descent of the hot plastic web W being discharged from the extruder head 17 (FIG. 8).

Figure 8A:
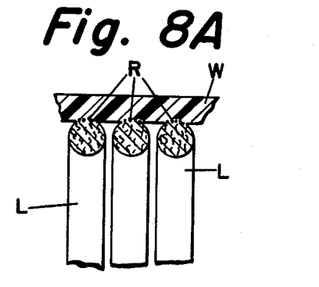
FIGS. 8A and 8B are sectional views respectively taken on lines 8A—8A and 8B—8B of FIG. 8.

When, as is preferred, the pile strands are of nylon or similar synthetic resin, the temperature and heat-storage capacity of the extruded web is sufficiently high, as more fully discussed in copending application Serial No. 75,281, to effect fusion between the extruded sheet and the root portions of the pile loops (FIG. 8A). To attain such fusion when the film is of polyethylene (Alathon #14) and the pile is nylon, the web temperature as it leaves the extruder die is in the range of 650° F. to 550° F. which is well above the melting temperature (480° F.) of nylon and safely below the degradation temperature of Alathon. The temperature of the extruded web as applied to the pile may be continuously monitored for control purposes as by the resistance thermometer strip 95 (FIG. 8) extending across and immediately above the conveyor 12 adjacent the extruder die.

To insure formation of such fusion bond between the applied web and the thermoplastic pile without need for recourse to such thickness of the web that the resulting non-woven fabric would have poor flexibility, the nylon pile material can be heated in advance of the extruder to a temperature well above room temperature and yet somewhat below its melting temperature of 480° F. Such preheating may be effected by the electrically-heated resistance rod 96 (FIG. 8) serving as a radiant heater. The temperature of the preheated pile material may be continuously monitored for control purposes as by the resistance-thermometer element 97 extending across and immediately above the conveyor 12 in advance of the extruder die 40.

By way of specific example, with the nylon pile (3/30s–15 denier–3½″ staple–66 nylon polymer yarn) preheated to a temperature of 200° F. and with the Alathon sheet extruded at a temperature of 600° F., the web need be only 54 mils thick to obtain a depth of fusion of about 3 mils in one second. With this depth of fusion, it is insured that the filaments or fibres of each strand are fusion-bonded to the backing web several times within the staple length. The resulting bond, in the finished cooled fabric, is so strong that application of tension to the free end of the pile loop will usually break the loop before the root or base portion pulls or breaks away from the Alathon web. Alathon has a density of the order of 0.914 and a melt-index of about 1.8.

With a web thickness of 54 mils, the resulting fabric is very flexible suiting it for use as rugs or carpet. When it is desired to heat-shape the fabric for use as contoured stair treads, car mats and the like, the extruded web may be of substantially greater thickness, for example, as great or greater than 75 mils to provide rigidity. In such case, because of the greater stored heat of the web as extruded, a good fusion bond with the thermoplastic strands can be effected with lower preheat temperature of the strands and in some cases preheating may be omitted.

Figure 8B:
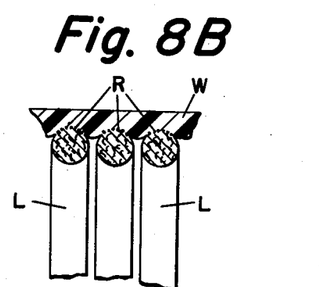

Substantially immediately after the hot web has been applied to the root pile material, the resulting non-woven fabric on conveyor 12 is passed below the compression roll 101. As indicated in FIG. 8, the still hot plastic web is forced around the base loops and into the spaces between them (FIGS. 8A and 8B) and into the spaces between the individual strands. The mechanical bonding so effected supplements the aforedescribed fusion bonding and in many cases it is accompanied by further fusion bonding. When the pile material is not fusible, as when of wool or cotton for example, such mechanical bonding is itself sufficiently strong to meet the normal requirements of many carpet and rug fabrics.

In its transport by conveyor 12, the fabric is shortly thereafter passed below a compression chill roll 101A which is of substantially greater diameter for removal of heat from the plastic backing of the non-woven fabric. This chilling or cooling sets the plastic and shortens the time lapse necessary before the fabric can be pulled from the conveyor without danger of separation of the pile facing due to the large area of frictional engagement between the pile loops and the conveyor blades or bars 19. The setting of the plastic backing layer while in flat state on the conveyor insures that it will have a set which resists curling when the fabric is in use. This is of importance when the fabric is used as a floor covering since it minimizes tripping accidents. A smooth chill roll results in a smooth underface on the plastic web for intimate contact with the floor and such surface has a non-slippery characteristic which is quite unexpected for polyethylene. Such characteristic appears to be due to a slight surface oxidation occurring at extrusion temperatures in the range of about 550° F. to 650° F.

The roll 101 is preferably hollow and continuously receives cooling liquid from supply line 108 which extends into or through one end of the hollow shafts 109 of the roller. The discharge pipe 109 similarly passes into or through the opposite end of shaft 109. The temperature and rate of flow of the incoming coolant may be controlled in manner per se known to effect rapid chilling of the plastic backing sheet: a roll temperature of about 50° F. has been found satisfactory. It is preferable that both the small diameter compression roll and the larger diameter chilling and pressing roll be utilized particularly when a very strong bond is to be made. The compression roll, because of its small diameter, can be positioned very close to the extruder die so to effect a larger area of engagement between the pile fabric and the hot web while the latter is still above the melting temperature of the thermoplastic pile material.

The pressure exerted by rolls 101 and 101A on the applied hot plastic web is adjustable for control of the extent to which the plastic is forced about the root portions of the pile loops for fusion and/or mechanical bonding thereto. Since the arrangement for varying the pressure is the same for both rolls, only one of them need be illustrated and described. In the arrangement shown for roll 101A (FIGS. 1 and 2), the bearing blocks 102, 102 for the opposite ends of the shaft of roller 101 are attached to a pair of upwardly extending bars 103, 103. The shaft 104 rotatably supported by the extension 105 of the vertical frame members 106 is provided with eccentric ends 107 which are rotatably received by the mounting bars 103 for roller 101A. Thus, the lever 108 attached to shaft 104 may be set to different angular positions to raise or lower the axis of rotation of roller 101 and so change the pressure exerted on the plastic web. The bearing blocks 102, 102 of the roller slidably engage the forward faces of the vertical frame members 106 and are pressed against them as the conveyor moves forward.

Figure 9:
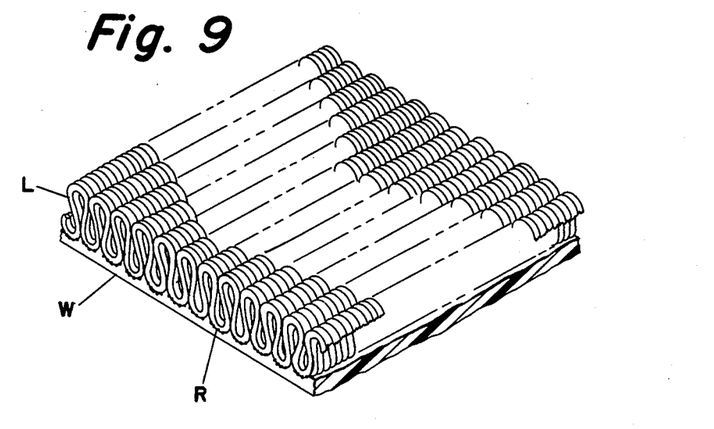
FIG. 9 is a perspective view of fabric made in accordance with FIGS. 8, 8A, 8B.

The resulting finished non-woven fabric, as shown in FIG. 9, consists of the plastic web backing W and the pile facing formed by the closely packed loops L of the pile strands. Such fabric is well suited for use as a rug or carpet fabric. If desired, the outer free ends of some or all of the loops may be cut open or sheared to provide what may be termed a plush, velvet or cut pile fabric. It shall also be understood that the lower or pile-engaging faces of the loop-forming blade 50A and loop-holding blade 65A may be notched to form loops of different depth so to make a fabric with an embossed facing as in aforesaid application Serial No. 75,281.

Figure 10:
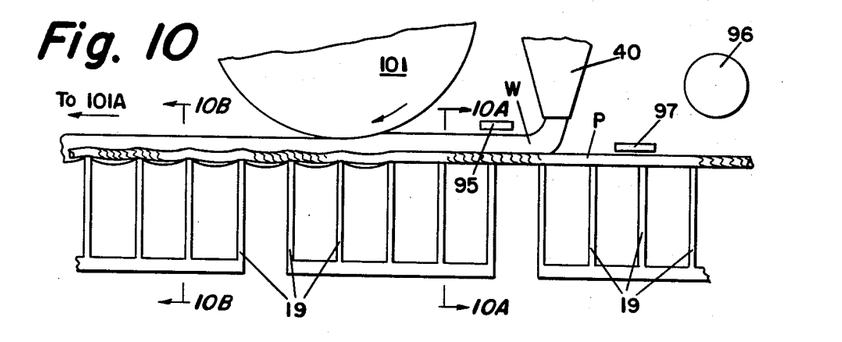
FIG. 10 is a fragmentary view similar to FIG. 8 but for another non-woven non-tufted product suited for use as inexpensive matting.
Figure 10A:
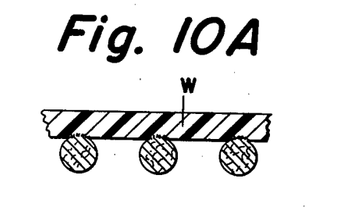
FIGS. 10A and 10B are sectional views respectively taken on lines 10A—10A and 10B—10B of FIG. 10.
Figure 10B:
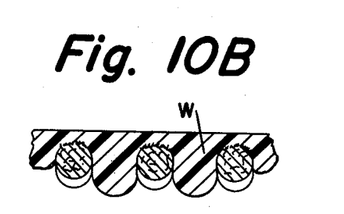
Figure 11:
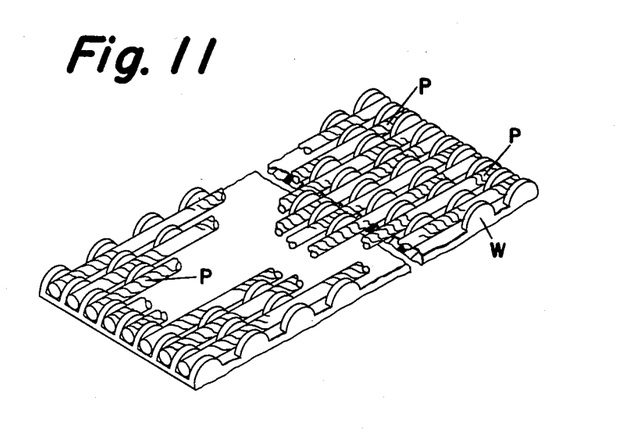
FIG. 11 is a perspective view of fabric made in accordance with FIGS. 10, 10A, 10B.

The apparatus above described may also be used to make another type of non-woven fabric suited for inexpensive matting by omitting the loop-forming mechanism, or removing its blades or by disabling the drive to such mechanism with the blades in their upper position. In such case, as shown in FIG. 9, the pile strands P, usually fewer in number than for making a carpet or rug fabric, lie flat across the upper edges of the conveyor bars 19. Thus, at the extruder station, the hot plastic web W is applied progressively to the entire length of each pile strand. When, and as preferred, the pile strands are of or include thermoplastic fibres, there is fusion bonding (FIG. 10A) between the hot plastic web and the base or root portion of each strand throughout its length. As the fabric passes below the compression roll 101, the pile strands P are pressed more deeply into the hot plastic web in the region of each conveyor bar 19 (FIG. 10B) locally to increase the area of the fusion bonding and to provide substtantial mechanical bonding. The resulting finished matting is shown in FIG. 11.

Squares, strips or other geometrical configurations may be laid side-by-side in abutting relation to provide desired patterns or wall-to-wall covering without any visible seam. The thermoplastic backing of the strips or other elements may be butt-welded or hot seamed together with such welds reinforced if desired by adhesive strips, or such strips may alone be utilized to join adjacent sections or elements of the non-woven fabric, all without producing any visible lines of demarcation.

What is claimed is:

An apparatus for making non-woven pile fabric comprising a conveyor having a multiplicity of spaced bars, a loop-forming mechanism for pushing strands of thermoplastic pile material into the gaps between said bars to form loops having root portions extending over said bars, extruder means for heating plastic material and discharging it onto the root portions of said pile loops as a thin web of hot plastic whose temperature is above the melting point of said thermoplastic pile material but whose heat content is insufficient to effect fusion of said strands, means adjacent said conveyor between said extruder means and said loop-forming mechanism for preheating the base portions of said thermoplastic pile loops to a temperature for which the heat content of the thin web effects fusion of the root portions of the pile loops to the web, and pressing and chilling means beyond said extruder means for forcing the hot plastic web between and about the root portions of said loop to form mechanical bonds and for chilling the web to set the fusion and mechanical bonds between the web and the pile loops before removal of the fabric formed thereby from said conveyor.

References Cited in the file of this patent

UNITED STATES PATENTS

| | | |
|---|---|---|
| 1,822,509 | Smith | Sept. 8, 1931 |
| 2,091,744 | Walker et al. | Aug. 31, 1937 |
| 2,539,690 | Boorn | Jan. 30, 1951 |
| 2,640,796 | Langer | June 2, 1953 |
| 2,690,206 | Mueller | Sept. 28, 1954 |
| 2,950,221 | Bauer et al. | Aug. 23, 1960 |
| 3,034,941 | Hessenthaler et al. | May 15, 1962 |